United States Patent
Ramaswamy et al.

(10) Patent No.: US 9,360,620 B2
(45) Date of Patent: Jun. 7, 2016

(54) THERMAL MANAGEMENT FOR PHOTONIC INTEGRATED CIRCUITS

(75) Inventors: Anand Ramaswamy, Goleta, CA (US); Jonathan E. Roth, Santa Barbara, CA (US); Erik Norberg, Santa Barbara, CA (US); Brian Koch, San Carlos, CA (US)

(73) Assignee: Aurrion, Inc., Goleta, CA (US)

( * ) Notice: Subject to any disclaimer, the term of this patent is extended or adjusted under 35 U.S.C. 154(b) by 627 days.

(21) Appl. No.: 13/597,711

(22) Filed: Aug. 29, 2012

(65) Prior Publication Data

US 2014/0064658 A1    Mar. 6, 2014

(51) Int. Cl.
*G02B 6/12*    (2006.01)
*G02B 6/42*    (2006.01)

(52) U.S. Cl.
CPC .......... *G02B 6/12004* (2013.01); *G02B 6/4269* (2013.01); *G02B 2006/12135* (2013.01)

(58) Field of Classification Search
CPC .. G02B 6/4266; G02B 6/4267; G02B 6/4268; G02B 6/4269; G02B 6/4272
See application file for complete search history.

(56) References Cited

U.S. PATENT DOCUMENTS

| | | | |
|---|---|---|---|
| 7,639,719 B2 * | 12/2009 | Fang | H01S 5/024 257/712 |
| 9,171,779 B2 * | 10/2015 | Lin | H01S 5/0208 |
| 2002/0118941 A1 | 8/2002 | Notomi et al. | |
| 2004/0026779 A1 | 2/2004 | Cai et al. | |
| 2006/0198414 A1 * | 9/2006 | Hashimoto | 372/46.01 |
| 2007/0274655 A1 | 11/2007 | Keyser et al. | |
| 2008/0044127 A1 | 2/2008 | Leising et al. | |

(Continued)

FOREIGN PATENT DOCUMENTS

| | | |
|---|---|---|
| EP | 1850160 | 10/2007 |
| EP | 2703856 A2 | 3/2014 |
| GB | 2392551 | 3/2004 |

OTHER PUBLICATIONS

Sysak, Matthew N., et al., "Hybrid Silicon Laser Technology: A Thermal Perspective", Sysak, M. N., Liang, D., Jones, R., Kurczveil, G., Piels, M., Florentino, M., Beausoleil, R. G., and Bowers, J. E., Hybrid Silicon Laser Technology: A Thermal Perspective; JSTQE Nov.-Dec. 2011 1490-1498.

(Continued)

*Primary Examiner* — Michelle R Connelly
*Assistant Examiner* — John M Bedtelyon
(74) *Attorney, Agent, or Firm* — Schwegman Lundberg & Woessner, P.A.

(57) ABSTRACT

Embodiments of the invention describe apparatuses, systems, and methods of thermal management for photonic integrated circuits (PICs). Embodiments include a first device and a second device comprising including waveguides, wherein the first and second devices have different thermal operating conditions. A first region is adjacent to a waveguide of the first device, wherein its optical mode is to be substantially confined by the first region, and wherein the first region has a first thermal conductivity to dissipate heat based on the thermal operating condition of the first device. A second region is adjacent to a waveguide of the second device, wherein its optical mode is to be substantially confined by the second region, and wherein the second region has a second thermal conductivity to dissipate heat based on the thermal operating condition of the second device. In some embodiments, thermal cross talk is reduced without significantly affecting optical performance.

18 Claims, 5 Drawing Sheets

(56) References Cited

U.S. PATENT DOCUMENTS

2010/0019385 A1* 1/2010 Bartley et al. ............. 257/741
2011/0235962 A1 9/2011 Shubin et al.

OTHER PUBLICATIONS

"European Application Serial No. 13003901.9, Partial European Search Report mailed Nov. 4, 2013", 6 pgs.

Office Action for U.S. Appl. No. 13/597,701 dated Sep. 3, 2013, 10 pages.

Extended European Search Report for European Patent Application No. 13003901.9, mailed May 2, 2014, 13 pages.

Liang, et al., "Optimization of Hybrid Silicon Microring Lasers", *IEEE Photonics Journal*, vol. 3, No. 3, Jun. 2011, pp. 580-587.

* cited by examiner

THERMAL MANAGEMENT FOR PHOTONIC INTEGRATED CIRCUITS

TECHNICAL FIELD

This disclosure relates generally to the field of photonics, and in particular but not exclusively, to thermal management for photonic integrated circuits.

BACKGROUND

Photonic Integrated Circuits (PICs) include interconnected semiconductor optical devices that are co-located on a single chip. Optical devices on a PIC have a variety of functionalities. For example, one optical device (e.g., a laser) may generate light, while another optical device (e.g., a detector) may absorb light. Optical devices have thermal operating conditions dependent on their function. For example, one optical device may need to dissipate heat, and another optical device may need to retain heat or dissipate less heat. Due to the close proximity of optical devices on a PIC, the thermal performance of one device may impact the performance of other devices on the PIC. For example, one device's heat retaining properties may contradict the desired heat dissipation properties of another device. PICs with buried oxide layers which serve as cladding layers to guide light in a waveguide can be susceptible to these problems because buried oxide layers generally have a low thermal conductivity (e.g., 1.5 W/m-K) and therefore can act as barriers to heat flow out of a device.

Current implementations of hybrid devices (e.g., optical devices with both silicon and a III-V semiconductor material) include such a buried oxide layer which serves as a cladding layer. One existing solution to thermal management problems is the use of polysilicon thermal shunts formed by etching out a portion of the buried oxide layer and back filling the etched region with polysilicon. However, such polysilicon shunts have limited effectiveness. Existing polysilicon shunts must be located certain lateral distances away from the center of the active region of a device due to the operational principle of the device. Light confined in the silicon waveguide of existing devices requires a cladding layer to confine the light; without the cladding layer, light will leak into the substrate below. Therefore, a buried oxide layer is located directly below the active region of existing devices, where heat dissipation is generally greatest, and the thermal shunts are located past the active region. The large thermal impedance and location of the buried oxide layer results in poor heat transfer away from the device's active region. Additionally, polysilicon has a relatively low thermal conductivity and high optical loss. Therefore, thermal shunts formed from polysilicon only marginally improve thermal performance.

Another solution aimed at improving thermal management in PICs is the use of a high thermal conductivity substrate. A device (e.g., a laser) fabricated with a high thermal conductivity substrate may have improved thermal performance, but the high thermal conductivity substrate can have a negative impact on other devices on the PIC. For example, if another device (e.g., a heater, which can heat the waveguide underneath it in order to exploit thermo-optic effects) is fabricated near a laser on the high thermal conductivity substrate, the high conductivity material can create a low impedance thermal path between the two devices. The resultant effect is unwanted thermal cross talk, and in the case of a heater, poor thermal efficiency measured as the increase in temperature per unit of power applied to the device (° C./W).

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system, and method of thermal management for photonic integrated circuits (PICs) are described herein. In one embodiment, thermal impedance is locally tailored to achieve improved thermal performance for a PIC having devices with varying thermal operation conditions. For example, a PIC can have regions with different thermal conductivities to dissipate heat based on the thermal operating conditions of devices with high thermal conductivity (or low thermal impedance) requirements (e.g., lasers, amplifiers, detectors, or other active devices) and devices with low thermal conductivity (or high thermal impedance) requirements (e.g., heaters). A PIC implemented with locally tailored high and low thermal impedance regions can improve thermal performance without affecting the optical performance of the device. Additionally, in some embodiments, devices can benefit from thermal isolation to minimize thermal cross talk.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
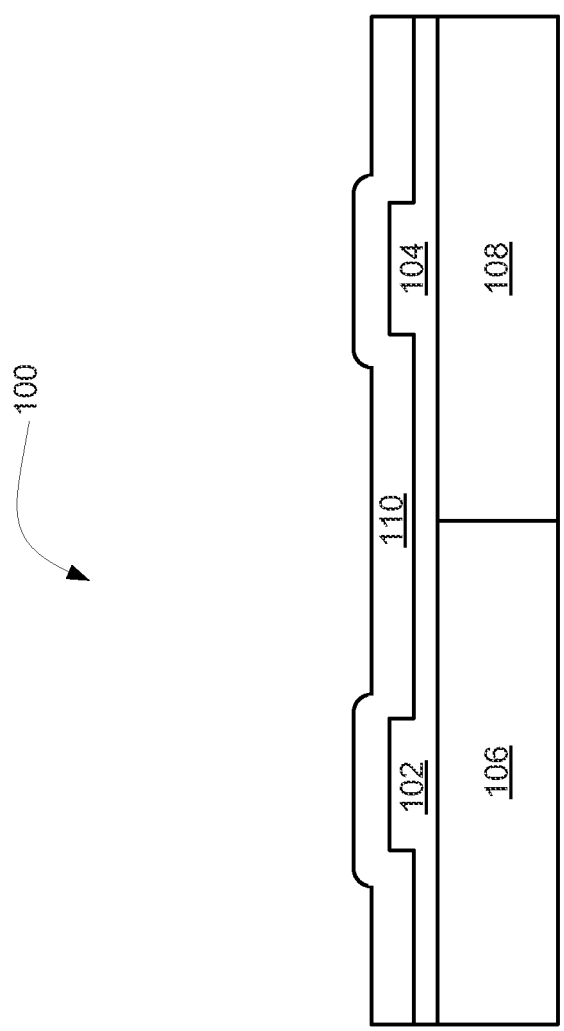
FIG. 1 is a block diagram of two devices with different thermal operating conditions on a photonic integrated circuit (PIC), and regions to dissipate heat based on thermal operating conditions of the devices, according to an embodiment of the invention.

FIG. 1 is a block diagram of two devices with different thermal operating conditions on a photonic integrated circuit (PIC), and regions to dissipate heat based on thermal operating conditions of the devices, according to one embodiment of the invention. PIC 100 includes a first device with first optical waveguide 102 and a second device with second optical waveguide 104. First waveguide 102 is to contain an optical mode, and second waveguide 104 is to contain an optical mode. The optical mode contained within first waveguide 102 and the optical mode contained within second waveguide 104 can be the same optical mode, or different optical modes. These modes need not be identical and depend on the geometry and material of the waveguide and its cladding layers. An optical mode is confined within a waveguide if a substantial portion of the energy associated with it is confined in the waveguide such that an insignificant amount of loss occurs as it propagates. In one embodiment, the first and second devices have different thermal operating conditions. For example, the first device may be a passive device and the second device may be an active device. In the illustrated embodiment, PIC 100 also includes cladding layer 110 to confine the optical modes within waveguides 102 and 104. Cladding material serves to confine an optical waveguide mode. For example, cladding material can be composed of a low refractive index (relative to the core of the waveguide) which serves to confine an optical waveguide mode within a proximate high refractive index material. PIC 100 includes first region 106 proximate to first waveguide 102, wherein the optical mode associated with the first waveguide is to be confined, in part, by first region 106. As described herein, two items are proximate (or adjacent) to one another if they are in close proximity to one another; proximate items may directly abut one another and share a common boundary, or proximate items can be separated by an intermediate layer, region, or other item, and therefore not share a common boundary. First region 106 has a first thermal conductivity to dissipate heat based on a thermal operating condition of the first device. PIC 100 includes second region 108 proximate to second waveguide 104, wherein the optical mode associated with the second waveguide 104 is to be confined, in part, by second region 108. Second region 108 has a second thermal conductivity to dissipate heat based on the thermal operating condition of the second device. For example, in one embodiment where the first device is a passive device with a low thermal conductivity requirement and the second device is an active device with a higher thermal conductivity requirement, the first thermal conductivity of first region 106 is lower than the second thermal conductivity of second region 108.

Figure 2A:
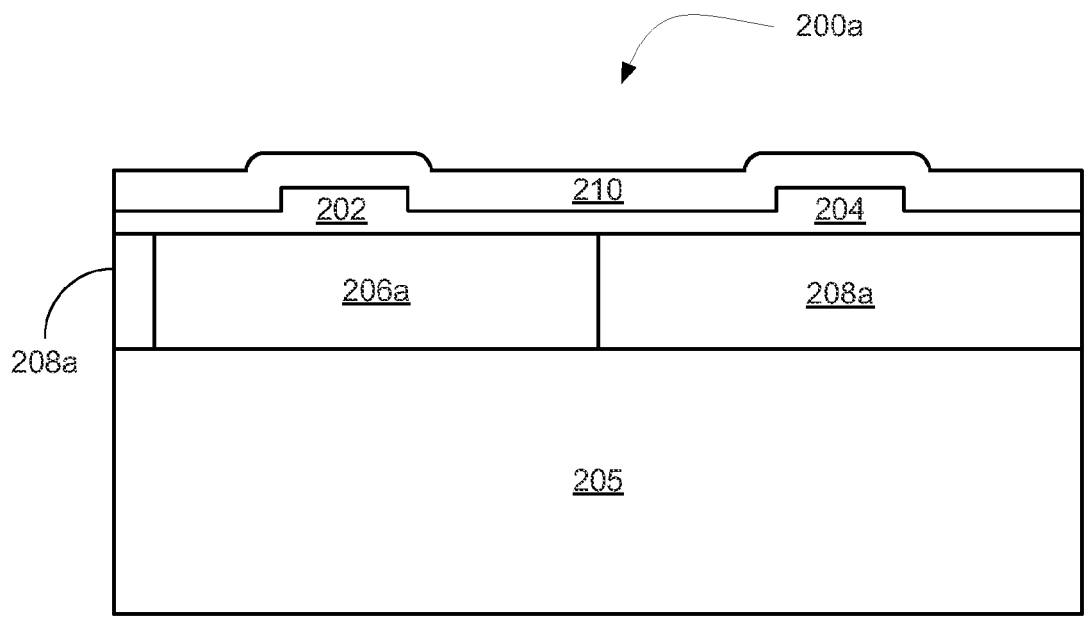
FIG. 2a is a block diagram of devices having different thermal operating conditions on a PIC, and regions to dissipate heat based on thermal operating conditions of the devices, according to an embodiment of the invention.
Figure 2B:
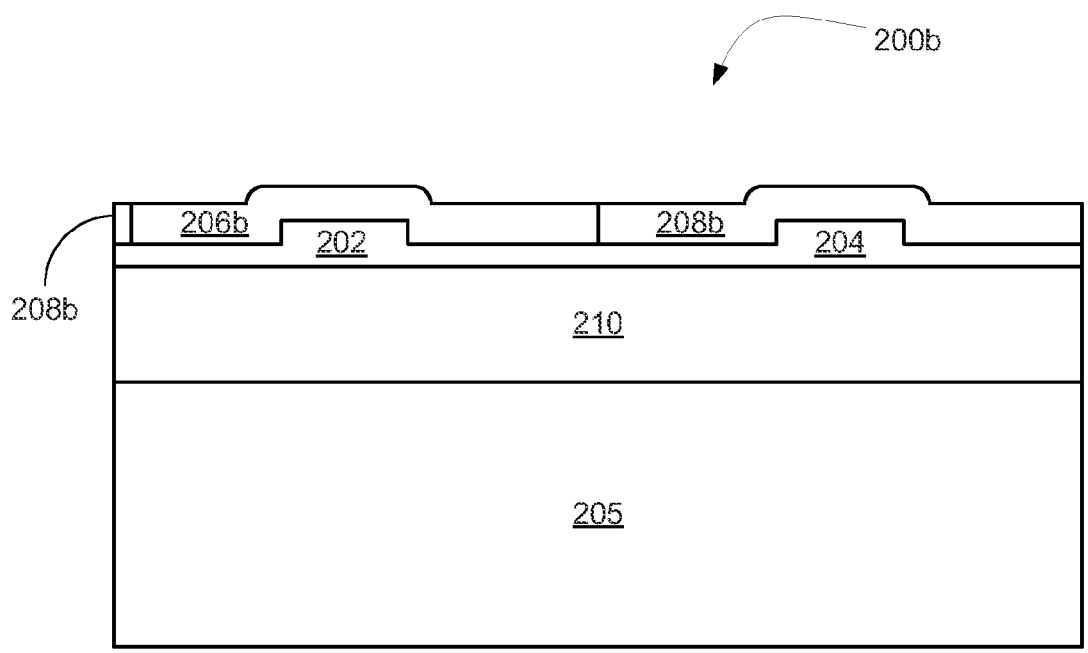
FIG. 2b is a block diagram of devices having different thermal operating conditions on a PIC, and regions to dissipate heat based on thermal operating conditions of the devices, according to an embodiment of the invention.

FIG. 2a and FIG. 2b are block diagrams devices with different thermal operating conditions on PICs, and regions to dissipate heat based on thermal operating conditions of the devices, according to embodiments of the invention. PICs 200a and 200b include a first device with waveguide 202 and second device with waveguide 204 on a substrate 205. Substrate 205 can be a silicon, gallium-arsenide, or any other PIC substrate material. The first and second devices have different thermal operating conditions. For example, the first device can include a device requiring efficient heat dissipation, and the second device can include a device requiring heat confinement or less efficient heat dissipation than the first device. In one such example, the first device is an active device (e.g., a laser, photodetector, modulator, or other active device), and the second device is a heater or a passive device (e.g., a passive wavelength division multiplexor, a passive filter, or other passive device).

PICs 200a and 200b include multiple waveguide cladding materials with differing thermal conductivities. Regions 206a and 206b are proximate to waveguide 202, and include a first cladding material with a first refractive index to confine the optical mode of waveguide 202. The first cladding material has a first thermal conductivity based on a thermal operating condition of the first device.

Regions 208a and 208b are proximate to waveguide 204 and include a second cladding material with a second refractive index to confine the optical mode of waveguide 204. The second cladding material has a second thermal conductivity based on a thermal operating condition of the second device. In one embodiment, each waveguide has differing cladding material on the same side of the waveguide. For example, in FIG. 2a, region 206a including the first cladding material and region 208a including the second cladding material are located on a "bottom" side of waveguides 202 and 204 (i.e., located between substrate 205 and waveguides 202 and 204). In one such embodiment, another cladding layer 210 is located on a "top" side of waveguides 202 and 204.

In FIG. 2b, region 206b including the first cladding material and region 208b including the second cladding material are located on a "top" side of waveguides 202 and 204 (i.e., waveguides 202 and 204 are located between substrate 205 and regions 206b and 208b). In one such embodiment, another cladding material is located between substrate 205 and waveguides 202 and 204. According to one embodiment, regions 206a/206b and regions 208a/208b are located near the active regions of the devices, but without interfering with the optical performance of the devices. In other embodiments, regions having different thermal conductivities could have different configurations (e.g., the regions could be located on different sides of the waveguides).

According to one embodiment, the different cladding materials used in regions 206a/206b and regions 208a/208b have substantially the same refractive indices. In one embodiment, if the regions have refractive indices that are substantially the same, light can optically transfer from one region to the next without substantial loss. For example, regions 206a/206b can include a Silicon Nitride (Si3N4) region, and regions 208a/208b can include a diamond region. In one such example, regions 208a/208b can be formed via chemical vapor deposition of a diamond layer. Regions 206a/206b can be formed by etching a portion of the diamond layer and depositing a nitride layer onto the etched diamond layer. In other embodiments, different processing techniques can be used to form regions 206a/206b and regions 208a/208b.

Silicon nitride and diamond have different thermal conductivities, but similar refractive indices. Diamond has a thermal conductivity in excess of 1000 W/m-K compared to silicon nitride's ~20 W/m-K. In other embodiments, other cladding materials having different thermal conductivities can be used (e.g., aluminum nitride or silicon can be used as a high thermal conductivity material). Different cladding regions with similar refractive indices but different thermal conductivities allow for close spacing of waveguides. The closely spaced waveguides can have similar optical performance, but very different thermal performance. If active devices are integrated on top of such waveguides, then the resultant structures too will have different thermal performance characteristics by virtue of the waveguide that resides underneath them.

Figure 3A:
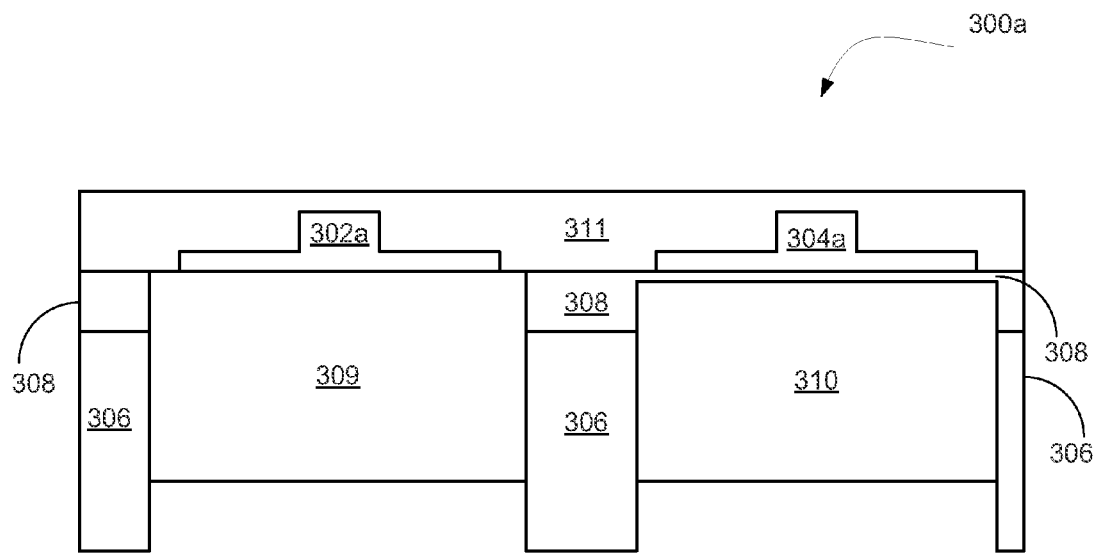
FIG. 3a is a block diagram of devices having different thermal operating conditions on a PIC, and regions to dissipate heat based on thermal operating conditions of the devices, according to an embodiment of the invention.
Figure 3B:
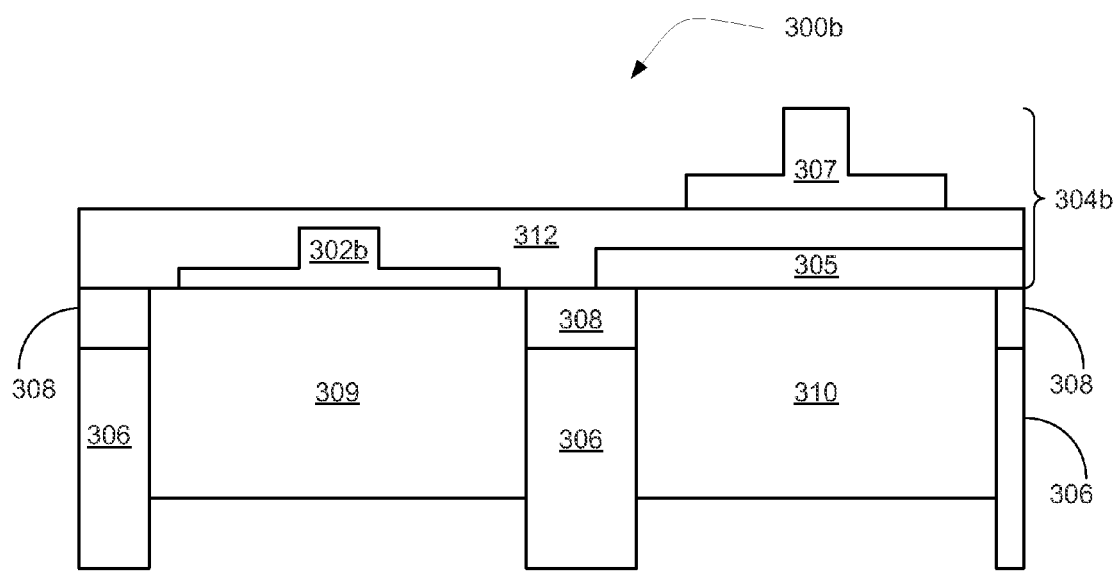
FIG. 3b is a block diagram of devices having different thermal operating conditions on a PIC, including a device with a hybrid silicon III-V waveguide, and regions to dissipate heat based on thermal operating conditions of the devices, according to an embodiment of the invention.

FIG. 3a and FIG. 3b are block diagrams of devices having different thermal operating conditions on a PIC, and regions to dissipate heat based on thermal operating conditions of the devices, according to an embodiment of the invention. PICs 300a and 300b include substrate 306, buried oxide layer 308, first devices including waveguides 302a and 302b, and second devices including waveguides 304a and 304b. In one embodiment, the first and second devices have different thermal operating conditions. Region 309 has a first thermal conductivity to dissipate heat based on the thermal operating condition of the first device, and Region 310 has a second thermal conductivity to dissipate heat based on the thermal operating condition of the second device. In one embodiment, such local tailoring of thermal impedance provides for heat dissipation according to each device's requirements, while also maintaining optical performance.

According to one embodiment of the invention, thermal impedance is locally tailored via means of a backside via and fill process on an SOI wafer. Another embodiment may be manufactured using a topside process. The backside processing can be done during front-end processing before all or the majority of the other processing steps or back-end processing after all or the majority of the other processing steps. In one embodiment, the backside processing includes locally removing a portion of substrate 306 and partially or entirely removing a portion of buried oxide layer 308. In one such embodiment, region 309 includes a first cavity in substrate 306 and buried oxide layer 308, and region 310 includes a second cavity in substrate 306 and buried oxide layer 308. According to one embodiment, these first and second cavities can be filled with materials that have thermal conductivities based on the thermal operating conditions of the proximate devices. For example, if the first device includes a device requiring low heat dissipation or heat confinement (as in the case of heaters for greater efficiency), the cavity of region 309 can be filled with a low thermal conductivity material such as a polymer, a dielectric, ceramic, or any other low thermal conductivity material. In another embodiment, the cavity of region 309 is not filled with a material (i.e., it is filled with air). If the second device includes a device requiring higher heat dissipation (i.e. more efficient out transfer of heat) than the first device, the cavity in region 310 can be filled with a high thermal conductivity material such as polysilicon, metal, a thermal paste, or any other material with a thermal conductivity that is higher than buried oxide layer 308. According to one embodiment, the filling of region 309 and the filling of region 310 may overlap (e.g., for ease of processing).

According to one embodiment, region 309 acts as a cladding region. For example, the material used to fill the cavity in region 309 can have a refractive index to confine the optical mode of waveguide 302a or 302b from region 309. Region 310 may not function as a cladding material, and therefore the optical mode is confined to the second waveguide of the second device via another means in order to avoid impacting the optical performance of the second device due to added absorption and/or scattering. For example, in FIG. 3a, buried oxide layer 308 is not entirely removed below waveguide 304a. In this example, buried oxide layer 308 functions as cladding for the optical mode within waveguide 304a. In 300a, buried oxide layer 308 is only partially removed to lower thermal impedance without affecting the optical performance of the first device. As illustrated in FIG. 3a, PIC 300a can include layer 311, which can be a cladding material.

In FIG. 3b, the second device is a hybrid device. Second waveguide 304b includes overlapping regions of silicon semiconductor region 305 and non-silicon (e.g., III-V) semiconductor region 307. Cladding layer 312 between silicon semiconductor region 305 and III-V semiconductor region 307 confines the optical mode to the III-V semiconductor region in the overlapping regions. In this embodiment, a portion of buried oxide layer 308 can be partially or entirely removed above regions 309 and 310. A portion of buried oxide layer 308 can be entirely removed for other types of waveguides where the optical mode does not interact with the buried oxide layer. Partially or entirely removing a portion of buried oxide layer 308 below a device can result in lower thermal impedance without degrading the optical performance of the device. It is also possible for layers 305 and 312 to be entirely or partially removed underneath region 307 across all or part of the bottom surface of 307. In one such embodiment, region 310 is filled in directly below layer 307 across all or part of the bottom surface of 307.

Figure 4:
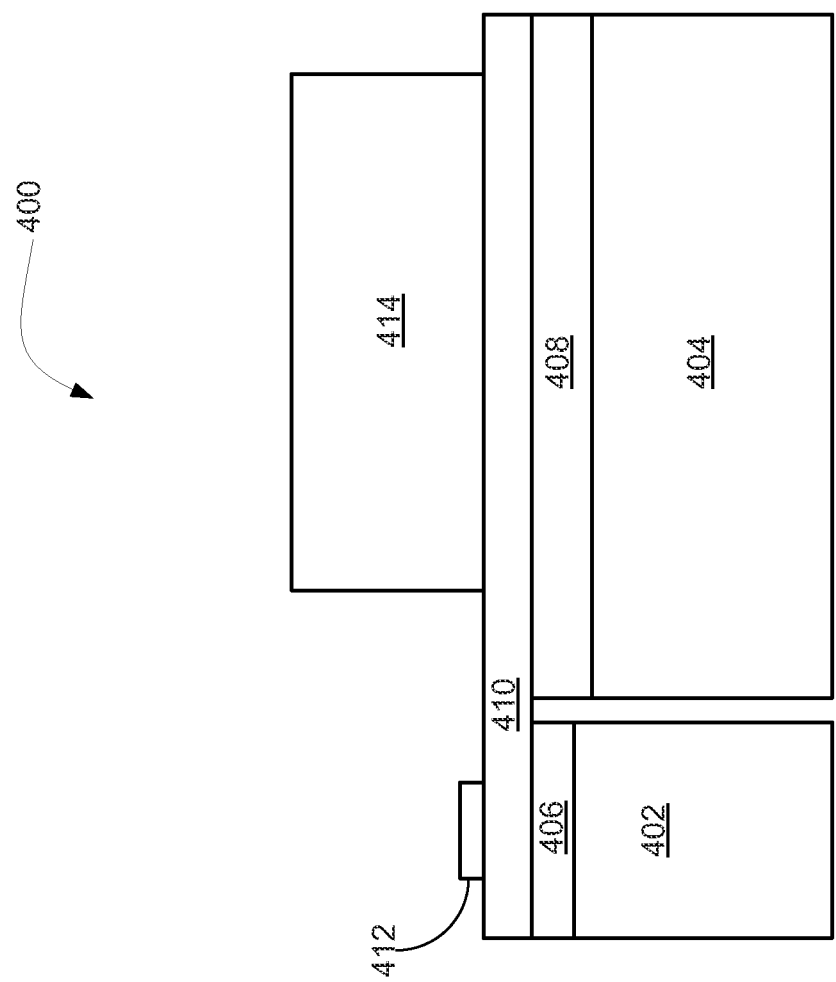
FIG. 4 is a block diagram of devices having different thermal operating conditions on a PIC, and regions to dissipate heat based on thermal operating conditions of the devices, according to an embodiment of the invention.

FIG. 4 is a block diagram of devices having different thermal operating conditions on a PIC, and regions to dissipate heat based on thermal operating conditions of the devices, according to one embodiment of the invention. PIC 400 includes silicon substrate 402 and 404, first region 406, second region 408, silicon layer 410, first device 412 and second device 414. In one embodiment, first device 412 and second device 414 have different thermal operating conditions. First region 406 has a first thermal conductivity to dissipate heat based on the thermal operating condition of first device 412, and second region 408 has a second thermal conductivity to dissipate heat based on the thermal operating condition of second device 414. In one embodiment, first region 406 is a buried oxide layer.

According to one embodiment, second region 408 includes a second cladding material, and is formed by selectively removing a portion of substrate and a portion of the buried oxide layer. The removed portions of substrate and buried oxide layer are not shown, but extended from substrate 402 and buried oxide layer 406 underneath second device 414. According to one embodiment, second region 408 is further formed by transferring a diamond-on-silicon wafer onto silicon layer 410. In one embodiment, PIC 400 leverages the benefits of planar transfer substrates and avoids having to bond III-V (active) material early in the process. According to one embodiment, like buried oxide layer 406, diamond layer 408 has favorable properties for optical waveguiding; unlike buried oxide layer 406, the thermal conductivity of diamond layer 408 is high (over 1000× buried oxide). Thus, in the illustrated embodiment, PIC 400 includes regions 406 and 408 with differing thermal conductivities, wherein the optical modes residing in the waveguides of devices 412 and 414 are isolated from regions 406 and 408.

Figure 5:
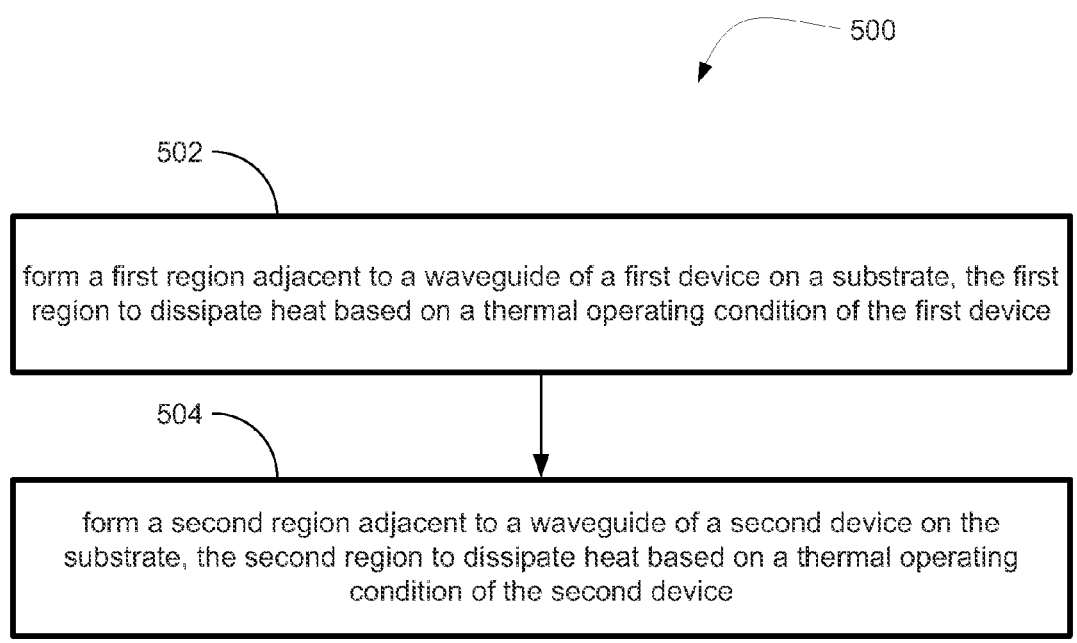
FIG. 5 is a flow diagram of a method of manufacturing a PIC with devices having different thermal operating conditions and regions to dissipate heat based on thermal operating conditions of the devices, according to an embodiment of the invention.

FIG. 5 is a flow diagram of a method of manufacturing a PIC with devices having different thermal operating conditions and regions to dissipate heat based on thermal operating conditions of the devices, according to an embodiment of the invention. Although shown in a particular sequence or order, unless otherwise specified, the order of the actions can be modified. Thus, the illustrated implementations should be understood only as examples, and the illustrated method can be performed in a different order, and some actions may be performed in parallel. Additionally, one or more actions can be omitted in various embodiments of the invention; thus, not all actions are required in every implementation.

The PIC referred to in flow diagram 500 may be described as having a first and second device on a substrate, the first device including a first waveguide to contain an optical mode, and the second device including a second waveguide to contain an optical mode (e.g., waveguide 102 and waveguide 104 of FIG. 1). The first and second devices have different thermal operating conditions. Method 500 includes operations for forming a first region (e.g., region 106 of FIG. 1) proximate to the first waveguide, wherein the first region has a first thermal conductivity to dissipate heat based on the thermal operating condition of the first device, 502. The optical mode associated with the first waveguide is to be isolated from the first region. Method 500 also includes operations for forming a second region (e.g., region 108 of FIG. 1) proximate to the second waveguide, wherein the second region has a second thermal conductivity to dissipate heat based on the thermal operating condition of the second device, 504. The optical mode associated with the second waveguide is to be isolated from the second region.

In one embodiment, forming the second region (e.g., regions 208a or 208b of FIG. 2a-b) includes chemical vapor deposition of a diamond layer on the substrate. In one such embodiment, forming the first region (e.g., regions 206a or 206b of FIG. 2a-b) is formed by etching a portion of the diamond layer and depositing a nitride layer on the diamond layer. After deposition of the nitride layer, a chemical-mechanical planarization (CMP) process can be used to planarize the deposited layer(s). In one embodiment, method 500 includes creating the waveguides (e.g., waveguides 202 and 204 of FIG. 2a-b) by, for example, performing a layer transfer of a silicon layer and patterning of the transferred silicon layer. After forming the waveguides, another cladding layer (e.g., cladding layer 210 of FIG. 2a-b) can be applied (e.g., via layer transfer, deposition, or other method).

In another embodiment, forming the first region (e.g., first region 406 of FIG. 4) includes forming a buried oxide layer on top of the substrate (e.g., substrate 402 of FIG. 4). In one such embodiment, forming the second region (e.g., second region 408 of FIG. 4) includes selectively removing a portion of the substrate and a portion of the buried oxide layer and transferring a diamond-on-silicon wafer (e.g., silicon substrate 404 and diamond layer 408 of FIG. 4) onto the silicon layer (e.g., silicon layer 410 of FIG. 4). In one such embodiment, after forming the buried oxide layer on the substrate, a silicon layer is applied to the buried oxide layer, and another oxide layer is applied to the silicon layer (e.g., to create a transfer substrate for the silicon layer). Next, a portion of the substrate and a portion of the buried oxide layer are removed to create the second region, as described above. A diamond-on-silicon wafer is flipped and transferred onto the SOI wafer. The diamond-on-silicon transfer can be oxide assisted, direct via surface activation, or any other transfer process. After transferring the diamond-on-silicon wafer, the top oxide layer (e.g., the transfer substrate) can be removed, and the silicon layer can be patterned. Further processing can be done to create devices, such as applying metal for a heater, or bonding a III-V semiconductor material to the silicon layer to create an active device.

As described herein, embodiments of the invention include regions of different thermal conductance on a PIC without impacting the optical performance of devices on the PIC.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A layered photonic integrated circuit, comprising:
a substrate including a buried oxide layer, the buried oxide layer having a top surface that defines a plane extending in a lateral direction;
a first waveguide positioned on a top side of the plane;
a first region laterally aligned with the first waveguide and extending at least partially through the buried oxide layer toward the plane, the first region having a first thermal conductivity;
a second waveguide positioned on the top side of the plane and laterally offset from the first waveguide; and
a second region laterally aligned with the second waveguide and extending at least partially through the buried oxide layer toward the plane, the second region having a second thermal conductivity different from the first thermal conductivity.

2. The layered photonic integrated circuit of claim 1, wherein the first region extends only partially through the buried oxide layer toward the plane.

3. The layered photonic integrated circuit of claim 1, wherein the first region extends fully through the buried oxide layer to the plane.

4. The layered photonic integrated circuit of claim 1, wherein the first region extends laterally beyond opposing lateral edges of the first waveguide.

5. The layered photonic integrated circuit of claim 1, wherein the second region extends only partially through the buried oxide layer toward the plane.

6. The layered photonic integrated circuit of claim 1, wherein the second region extends fully through the buried oxide layer to the plane.

7. The layered photonic integrated circuit of claim 1, wherein the second waveguide comprises:
a silicon semiconductor layer disposed on the top side of the plane;
a cladding layer disposed on the silicon semiconductor layer; and
a III-V semiconductor layer disposed on the cladding layer.

8. The layered photonic integrated circuit of claim 7, wherein the cladding layer further extends over the first waveguide.

9. The layered photonic integrated circuit of claim 8, wherein the cladding layer further laterally surrounds opposing lateral edges of the first waveguide.

10. The layered photonic integrated circuit of claim 9, wherein the cladding layer further contacts the buried oxide layer at locations away from the first and second waveguides.

11. The layered photonic integrated circuit of claim 1, wherein the first waveguide comprises a passive optical device.

12. The layered photonic integrated circuit of claim 11, wherein the first region is an unfilled cavity.

13. The layered photonic integrated circuit of claim 11, wherein the first region includes a material having a low thermal conductivity.

14. The layered photonic integrated circuit of claim 13, wherein the first region includes a dielectric material.

15. The layered photonic integrated circuit of claim 14, wherein the dielectric material has a refractive index less than a refractive index of the first waveguide.

16. The layered photonic integrated circuit of claim 1, wherein the second waveguide comprises an active optical device.

17. The layered photonic integrated circuit of claim 16, wherein the second region includes a material having a high thermal conductivity.

18. The layered photonic integrated circuit of claim 17, wherein the second region includes a metallic material.

\* \* \* \* \*